(12) United States Patent
Kim

(10) Patent No.: US 8,401,377 B2
(45) Date of Patent: Mar. 19, 2013

(54) METHOD AND SYSTEM FOR PORTABLE VIDEO DISPLAY

(75) Inventor: Justin C. Kim, Great Neck, NY (US)

(73) Assignee: Jwin Electronics Corporation, Port Washington, NY (US)

( * ) Notice: Subject to any disclaimer, the term of this patent is extended or adjusted under 35 U.S.C. 154(b) by 1352 days.

(21) Appl. No.: 12/039,786

(22) Filed: Feb. 29, 2008

(65) Prior Publication Data

US 2009/0220218 A1  Sep. 3, 2009

(51) Int. Cl.
*H04N 5/92* (2006.01)

(52) U.S. Cl. ........ 386/362; 386/358; 386/359; 386/360; 386/361; 345/156

(58) Field of Classification Search .................... 386/126
See application file for complete search history.

(56) References Cited

U.S. PATENT DOCUMENTS

| | | | | |
|---|---|---|---|---|
| 7,054,965 B2* | 5/2006 | Bell et al. | ......................... | 710/72 |
| 7,869,195 B1* | 1/2011 | Patton | ...................... | 361/679.01 |
| 2006/0046031 A1* | 3/2006 | Janevski | ..................... | 428/195.1 |
| 2006/0181963 A1* | 8/2006 | Clayton et al. | .............. | 369/24.01 |
| 2008/0063770 A1* | 3/2008 | Chang | ............................ | 426/515 |
| 2009/0180259 A1* | 7/2009 | Peng | .............................. | 361/729 |
| 2011/0046757 A1* | 2/2011 | Leung | .............................. | 700/94 |

OTHER PUBLICATIONS

Philips User Manual: "Docking Entertainment System DVD Portable with Dock for iPod". Dec. 8, 2006, pp. 1-16.*
Phillips Index of Files/d/dcp750__37 from http://p4c.philips.com/files/d/dcp750__37/ pp. 1-2.*
Pocketables, "Philips Portable DVD players for iPods" Jan. 29, 2007, pp. 1-12.*
Sy Tan, "Dell's Latitude XT Convertible Laptop as Your Christmas Gift", Dec. 11, 2007 pp. 1-3 from http://www.mydigitallife.info/dells-latitude-xt-convertible-laptop-as-your-christmas-gift/.*

* cited by examiner

*Primary Examiner* — Farid Momayounmehr
*Assistant Examiner* — Lisa Lewis
(74) *Attorney, Agent, or Firm* — Greenberg Traurig, LLP.

(57) ABSTRACT

A portable video display system (PVDS) provides convenience of presenting video data to users in a variety of situations, such as while the users may be traveling. A PVDS can store video data through removable and/or installed memory, including a disc, and present the video through a video display, providing an autonomous video storage and display system that is portable such that users may experience video presentations conveniently under many circumstances. Common applications include use while a user is traveling, commuting, on vacation, and present in other places and situations where portable entertainment is desired. A PVDS may be used with headphones to increase privacy and minimize disturbance to others nearby while PVDS is in use. A PVDS may also have the ability to present other media data such as image data and/or audio data.

14 Claims, 4 Drawing Sheets

METHOD AND SYSTEM FOR PORTABLE VIDEO DISPLAY

BACKGROUND

A portable video display system for the presentation of a digital versatile disc (DVD) can provide a user with the ability to view DVDs while traveling or otherwise are transporting the portable video display system. DVDs are a popular storage medium for video data.

SUMMARY

A portable video display system (PVDS) provides convenience of presenting video data to users in a variety of situations, such as while the users may be traveling. A PVDS can store video data through removable and/or installed memory, including a disc, and present the video through a video display, providing an autonomous video storage and display system that is portable such that users may experience video presentations conveniently under many circumstances. Common applications include use while a user is traveling, commuting, on vacation, and present in other places and situations where portable entertainment is desired. A PVDS may be used with headphones to increase privacy and minimize disturbance to others nearby while PVDS is in use. A PVDS may also have the ability to present other media data such as image data and/or audio data.

In accordance with one embodiment, the present invention relates to a portable video presentation system including a body having a disc receptacle and a media player receptacle and a cover element hinged to the body, the cover element being configured to enclose the disc receptacle and the media player receptacle. The cover element may include a video display and a control interface on an exterior surface of the cover element, and the control interface may include a control element. The system may further include a media processor adapted to select one of a plurality of states based on user input received from the control element. The plurality of states may include a disc video data presentation state wherein disc video data is received by the media processor from a disc in the disc receptacle and a media player video data presentation state wherein player video data is received by the media processor from a media player in the media player receptacle.

In accordance with another embodiment, the present invention relates to a portable video presentation system, including a body containing a video display interconnected to a media processor, a disc player provided within the body, the disc player being interconnected with the media processor, a media player interface provided within the body and adapted to receive a portable media player, the media player interface interconnected with the media processor. The system may include a control interface on a surface of the body and adapted to receive a user instruction to control video presentation on the video display. The media processor may be adapted to request selectively video data from the disc player or the portable media player based on the user instruction, to process the video data received in response to the request into a format suitable for the video display, and to transmit the processed video data to the video display.

In accordance with yet another embodiment, the present invention relates to a method including receiving at a body a portable media player at a media player interface, the portable media player containing player video data. The method further includes receiving at the body a disc containing disc video data, and initiating presentation of the disc video data. The method further includes receiving through a user interface an instruction to initiate presentation of player video data, ceasing presentation of the disc video data in response to the instruction, and requesting the player video data from the portable media player.

DETAILED DESCRIPTION

The following description of various embodiments is merely exemplary in nature. While various embodiments have been described for purposes of this specification, various changes and modifications may be made to the embodiments disclosed herein.

Video may be stored on discs (e.g., Digital Versatile Disc or "DVD") or similar data storage elements. A user may carry a variety of DVDs to play on a portable video display system (PVDS), and the user may choose from the DVDs in order to select the video data to be displayed. For example, a DVD may contain video data for a particular movie, and the user may select the movie to be watched through selecting a particular DVD.

A personal media player ("PMP") is an example of a PVDS, providing a system on which a user may view and/or listen to media, often with storage space available for storing media in electronic format. A PMP may store media in electronic format using a storage device such as a hard disk drive or a solid state memory. An example of a PMP is the iPod sold by Apple, Inc. of Cupertino, Calif. Other examples of PMPs are: the Zune sold by Microsoft, Inc. of Seattle, Wash., and the Sansa View sold by SanDisk of Milpitas, Calif. PMPs are available with the capacity to store many hours of media, including video and/or audio data.

Figure 1:
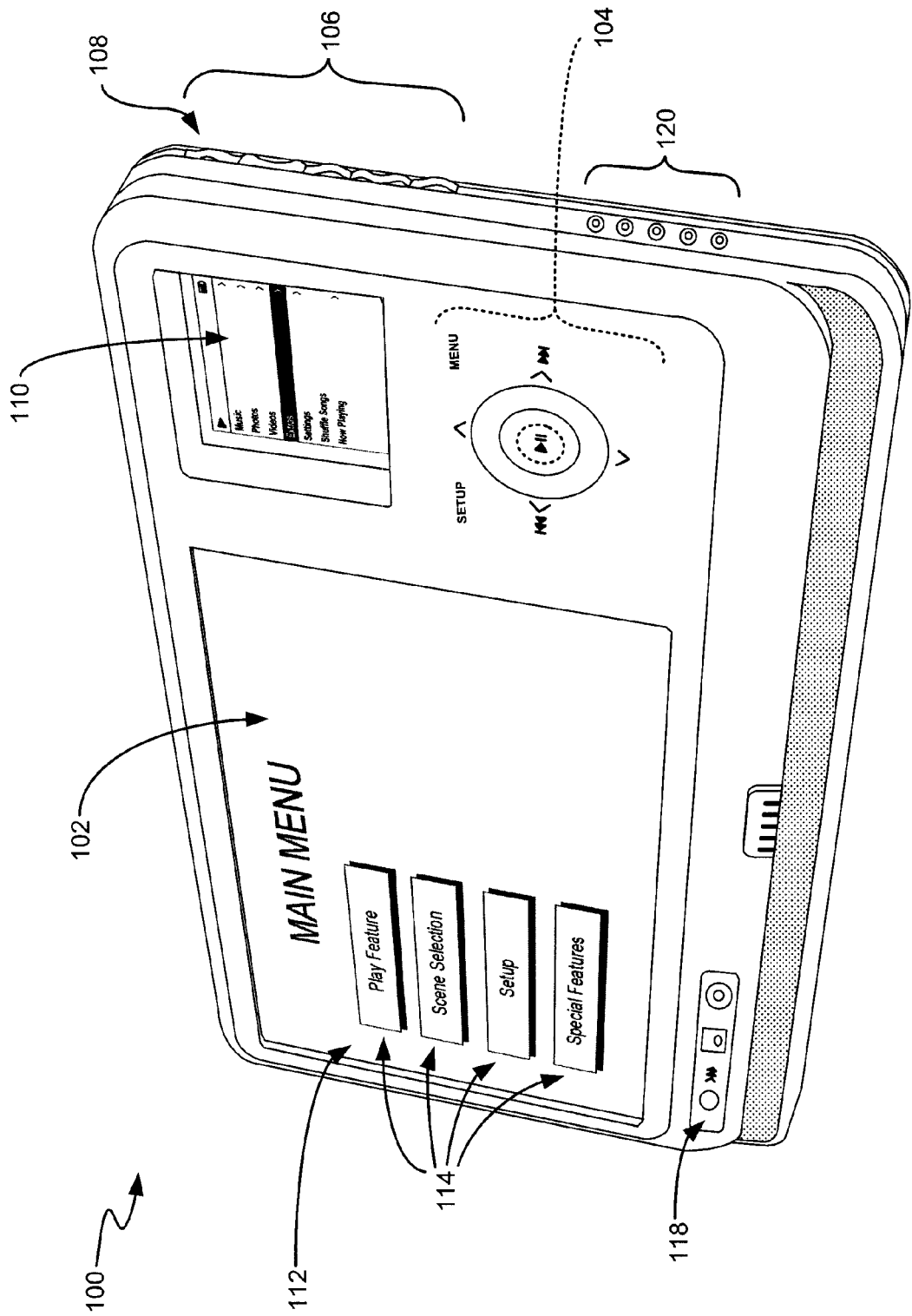
FIG. 1 shows an embodiment of a master portable video display system with the cover element closed.

FIG. 1 shows an embodiment of a master portable video display system (MPVDS) 100 with its cover element closed. The MPVDS 100 includes a video display 102, system control elements 106, and a control interface 104. System control elements 106 include a media source selection element 108. A media source selection element 108 is shown for selecting a source from which media presentation (e.g., video, audio, image) will be performed. For example, operating the media source selection element 108 may stop presentation of video data stored on a disc and initiate presentation of video data stored on a PMP 110. A media source selection element 108 may be a push button, control wheel, toggle switch and/or other interface element.

In one embodiment, the media source selection element 108 may control the source of media for presentation without user input beyond operation of the element. In another embodiment, operation of the media source selection element 108 may trigger a graphical user interface (GUI) 112, which may appear on the video display 102 to complete the selection of a media source. For example, the GUI 112 may guide a user through the media source selection process, including decision(s) whether to stop, pause, and/or store a saved position in the media currently being presented. The use of the GUI 112 on the video display and user inputs relating to the use of a GUI 112 is further described below.

The control interface 104 provides a user the ability to control video data presented on the video display 102. For example, the MVPDS 100 may be configured to request information from the PMP 110, control presentation states of the PMP 110, navigate menus of the PMP 110 and otherwise command the PMP 110 based on control elements on the MVPDS 100 being operated by the user. The control functions of the control elements of the PMP 110 may not be operational when the PMP 110 is connected via a media player interface to the MVPDS 100, including a wired or wireless interface as described further herein.

The MPVDS 100 may be able to control various aspects of the operation of the PMP 110 through commissioning the PMP 110 when the PMP 110 is connected to the MVPDS 100. In other words, when the PMP 110 is connected to the MPVDS 100 and the MPVDS 100 has put the PMP 110 into a commissioned mode, the control of the PMP 110 may be handled exclusively by the control elements 104, 106 on the MPVDS 100. A media processor that is part of the MPVDS 100, as described further herein, may control all aspects of the operation of the PMP 110 while the PMP 110 is in the commissioned mode. When the PMP 110 is in other non-commissioned modes, the PMP 110 may perform the functions of an autonomous PVDS. In the embodiment shown, the control elements on the PMP 110 are not accessible to a user when the PMP 110 is within the MPVDS. As described further below, the PMP 110 may or may not be even visible to the user when the PMP is within the MPVDS.

The control interface 104 may have navigational control elements, such as up, down, right, and left elements. Navigational control elements may be used in conjunction with the graphical user interface (GUI) 112 presented on the video display 102. For example, the GUI 112 may provide command selections 114 through which a user may navigate and select using the navigational control elements. The GUI 112 may comprise command selections 114 that allow a user to select portions of video data to display, and/or presentation options (e.g., subtitles, languages, screen modes). The GUI 112 presentation may also include commands for the selection of the source of video data. For example, the GUI 112 presentation may include a command to select video data on a DVD or video data on a PMP 110 for presentation on the video screen 102. The selection of separate sources of video data, such as a DVD or a PMP 110, is discussed further herein.

The MVPDS 100 includes system control elements 106, such as elements relating to power, volume, keylock, and media source selection element 108. A system control element 106 may perform the same function regardless of whether a GUI 112 is presented. For example, in one embodiment, a media source selection element 108 may be operated to switch between presenting media data from one media source to another media source, and the media source selection element 108 may perform the same function regardless of whether another GUI 112 is being presented.

There are many options for presenting the GUI 112 on the video display 102. When a control GUI 112 is displayed, presentation of video data may be paused, stopped, otherwise interrupted, continued on a smaller portion of the video display, and/or presented in the background while the control screen is overlaid on the video data. The GUI 112 may be overlaid on the video display 102 over video data, for example, as a set of partially transparent GUI elements presented over the video data. Alternatively, the GUI 112 may be presented in a separate portion of the video display. In response to the GUI 112 being presented, the video data may be presented in a modified manner. For example, the video data may be paused, may continue presentation, may fill the full frame of the video display 102, and/or may be scaled to make space available for the GUI 112. As another example, the GUI 112 may be presented with a background, such as a menu screen, while the video data is temporarily paused and/or otherwise not displayed.

Status indicators 118 are provided for displaying status of the MPVDS 100 to the user. The status indicators 118 may provide information about the source of the media being presented to the user. For example, a status indicator 118 may be provided to indicate that video is being presented from a DVD, that video is being presented from a PMP 110, or that audio is being presented from a PMP 100. A status indicator 118 may indicate information about the media or video being presented to the user, such as metadata, title, or other information. Other status indicators 118 may be included to indicate system status, such as power, state of charge on a battery, and/or error conditions.

Status indicators 118 may be combined into a single element, such as a display, that is able to indicate multiple states to a user. For example, a display may show a status that video presentation is presently coming from a PMP source, the title of the video, and/or the date the video was purchased.

Audio and video ports 120 are shown, provided for allowing a user to plug devices such as headphones or external monitors (e.g., television) into the MPVDS 100. In another embodiment, wireless interfaces (e.g., electromagnetic communications interface) may be provided as alternate audio and/or video ports 120. External speaker(s) may also be included on the MPVDS 100 for use instead or in addition to headphones.

Figure 2:
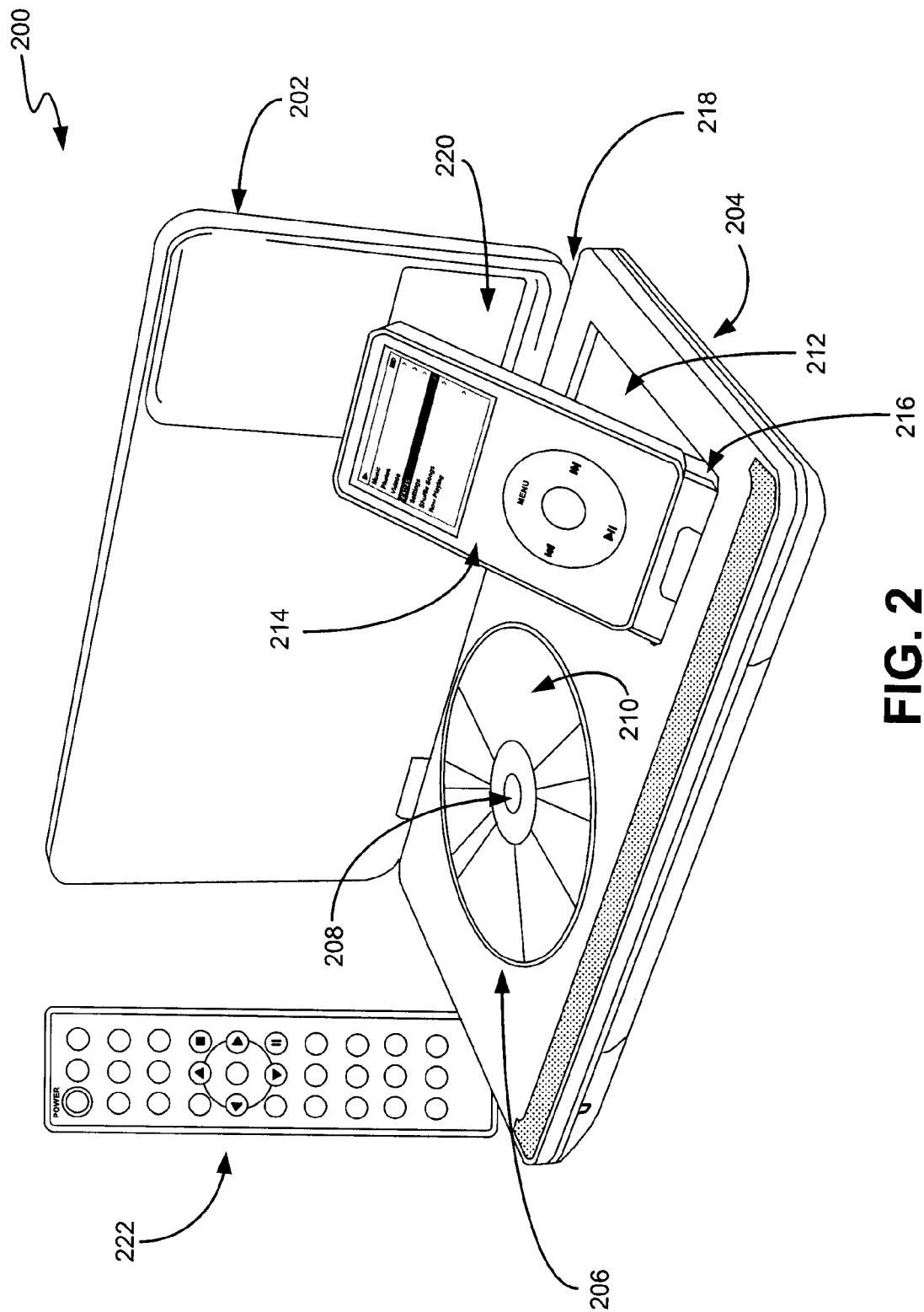
FIG. 2 shows another view of the embodiment of a master portable video display system with the cover element opened.

FIG. 2 shows another view of the embodiment of a master portable video display system (MPVDS) 200 with the cover element opened. The MPVDS 200 includes a cover element 202, shown in an opened position relative to a main body 204. The main body 204 has a disc receptacle 206 including a disc spindle 208 for holding a DVD 210. The disc receptacle 206 has a space for the disc to rotate through rotation of the spindle 208 and a mechanism through which data (e.g., video data) is read from the DVD 210. The main body 204 also has a PMP receptacle 212 including a space to hold a PMP 214 and a media player interface 216. Control elements, further described herein, may be provided on an exterior surface of the cover element 202 and/or on the side of the main body 204. A remote control interface 222 may provide alternate capabilities for providing control to the MPVDS 200.

In the embodiment shown, the media player interface 216 is shown as a mechanically connected interface (e.g., wired interface). In alternate embodiments, the media player interface 216 may be a wireless interface (e.g., electromagnetic interface). For example, many wireless interfaces are available, and some PMPs are capable of utilizing these interfaces to transmit and/or receive control data and/or media data (e.g., video data). Also in the embodiment shown, the media player interface 216 is rotatable with respect to the main body 204 in order to facilitate connecting the media player interface 216 with the PMP 214. For example, the media player interface 216 may be rotated to a position that is out of plane from the main body 204, may be connected to the PMP 214, and may be then rotated back into its in-plane position maintaining the connection between the media player interface 216 and the PMP 214.

In other embodiments, the mechanical media player interface 216 may remain in-plane with the main body 204, and the PMP 214 may be slid into connection with the mechanical interface. For example, the PMP 214 may be slid in-plane through an opening on the side of the main body 204, and such sliding may engage the PMP 214 with the mechanical media player interface 216.

The cover element 202 has a hinged connection 218 to the main body 204. The hinged connection 218 allows the cover element 202 to be closed for the presentation of video data on the video display, and opened for complete access to both the disc receptacle 206 and the PMP receptacle 212 for insertion, removal, and/or replacement of the disc 210 and/or PMP 214. The cover element 202 includes the video display shown on its exterior surface such that the video display is visible (see FIG. 1) when the cover element 202 is closed.

The cover element 202 is used to enclose the PMP 214 and disc 210 while allowing access when the cover element 202 is opened. In an alternative embodiment, there is no cover element, and a user may insert a disc, a PMP 214, or both through sliding, attaching and/or otherwise connecting the disc and/or the PMP 214 to the MPVDS 200. For example, a slide tray may be provided that slides out of the MPVDS 200. As another example, a tray-less sliding entry system may be provided wherein the user inserts a disc and/or PMP 214 into the MPVDS 200 without the assistance of a sliding tray that slides outside the main body 204. The tray-less system may include an internal mechanism to guide the disc 210 and/or PMP 214 completely into position.

In one embodiment, the cover element 202 may enclose only the disc 210 or the PMP 214. As an alternative embodiment, the cover element 202 encloses the PMP 214, and a disc 210 may be slid in from the side of the MPVDS 200. As another embodiment, the cover element 202 encloses the disc 210 and a PMP 214 may be connected externally or slid into the MPVDS 200.

The cover element 202 is shown with a translucent window 220 that allows a screen of the PMP 214 to be viewed through the cover. In one embodiment, the MPVDS 200 uses the PMP 214 screen to present a GUI (e.g., including menu information) while the PMP 214 is selected as a source for media presentation. For example, after a user has selected the PMP 214 for media presentation, the user may navigate through a GUI on the screen of the PMP 214 in order to control media presentation from the PMP 214 in a manner similar to that of the MPVDS shown in FIG. 1.

As another embodiment, a GUI representing the functions of the PMP 214 may be presented on the video display of the MPVDS 200, as described further herein, thereby allowing a user to navigate through the GUI on the MPVDS video display and translating the instructions from the user into a format suitable for transmitting to the PMP 214. In this embodiment, the translucent window 220 may not be included, and instructions may be sent to the PMP 214 to turn off the PMP screen in order to save power. In alternative embodiments, control of video data presentation from the PMP 214 may be completely controlled by control elements on the MPVDS 200 and/or GUIs displayed by the MPVDS, as described further herein.

The control elements of MPVDS 200 may be similar or identical to those described in FIG. 1. The internal structure of the MPVDS 100 of FIG. 1 may be similar or identical to the MPVDS 200.

Figure 3:
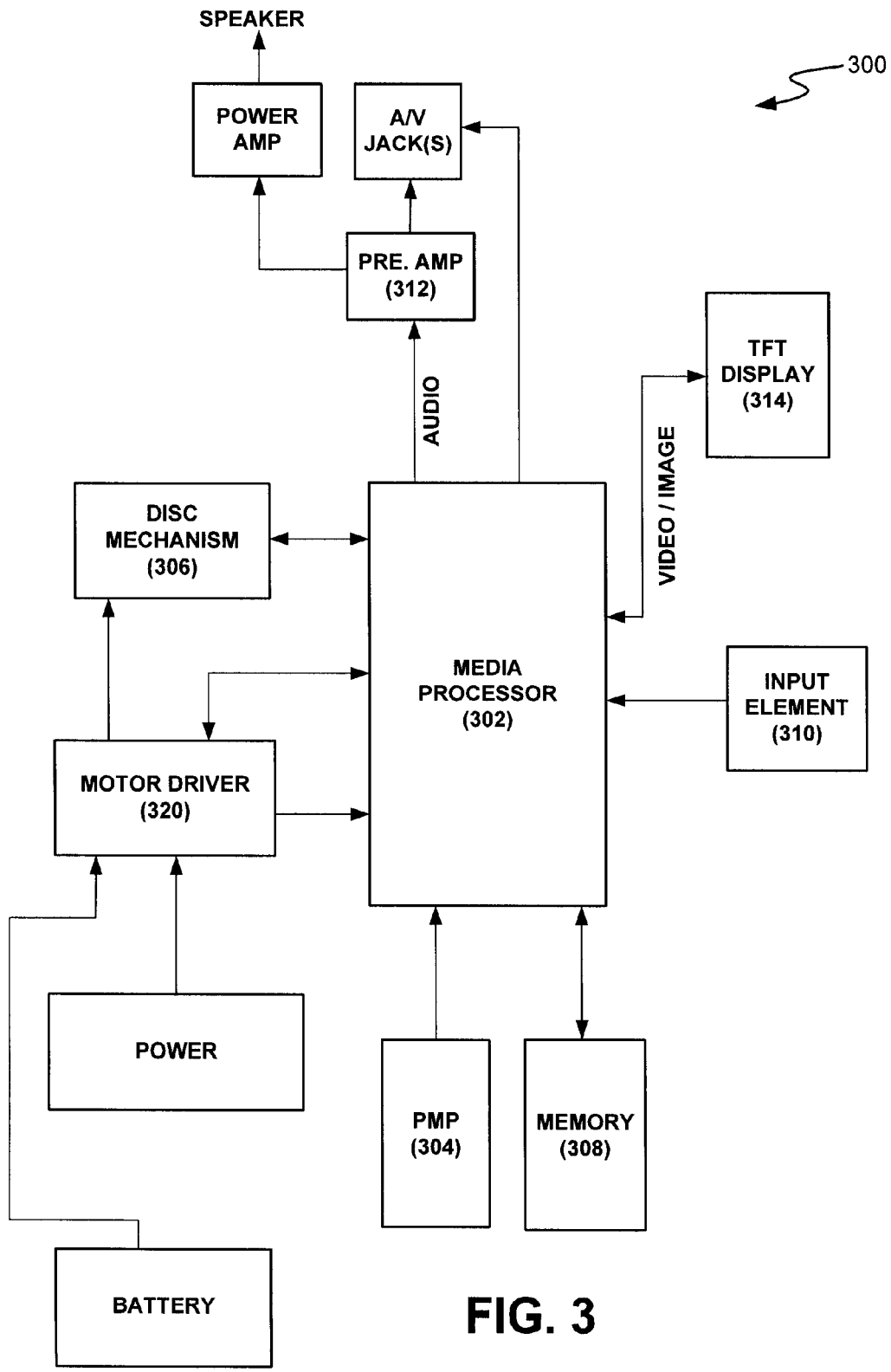
FIG. 3 shows a block schematic of a master portable video display system.

FIG. 3 shows a block schematic 300 of a master portable video display system. The block schematic 300 shows a media processor 302 connected to a PMP 304 and a DVD mechanism 306. The media processor 302 may also be connected to memory 308 within the MPVDS. The memory 308 may be removable and/or installed within the MPVDS or may include a removable portion of memory and an installed portion of memory. The media processor 302 may be connected to the PMP 304, the DVD mechanism 306 and/or the memory 308 through connections for receiving media data (audio data and/or video data) and for controlling the PMP 304, the DVD mechanism 306 and/or the memory 308. For example, the media processor 302 may be connected to motor driver 320 that is connected to a DVD mechanism 306 for the purpose of controlling the physical properties of the DVD mechanism 306 (e.g., spinning a spindle, guiding an optical reading element). As another example, the media processor 302 may be connected to the PMP 304 through a media player interface such that the media processor 302 can place the PMP 304 into a commissioned mode, as described further herein.

The media processor 302 is further connected to input elements 310, which include the system control elements further described herein. Input elements 310 may be connected to the media processor 302 through a wired interface (e.g., wired connections from the exterior of the cover element) and/or through a wireless interface (e.g., infrared handheld remote control). The media processor 302 is also connected to audio/video pre-amplification circuitry 312 and the video display 314 for presenting the media (e.g., images, video and/or audio).

Elements of the systems described herein may be implemented in hardware, software, firmware, any combination thereof, or in another appropriate medium. The systems described herein may implement methods described herein. In addition, methods described herein which, when implemented in hardware, software, firmware, any combination thereof, or in another appropriate medium, may form systems described herein. Therefore, the descriptions of the methods and systems herein supplement each other and should be understood by those with skill in the art to form a cumulative disclosure.

The methods described herein may be performed by any part of an element of a system described herein. In addition, the methods described herein may be performed iteratively, repeatedly, and/or in parts. In addition, some of the methods or parts of the methods described herein may be performed simultaneously. In addition, elements of the systems described herein may be distributed functionally in any configuration.

Figure 4:
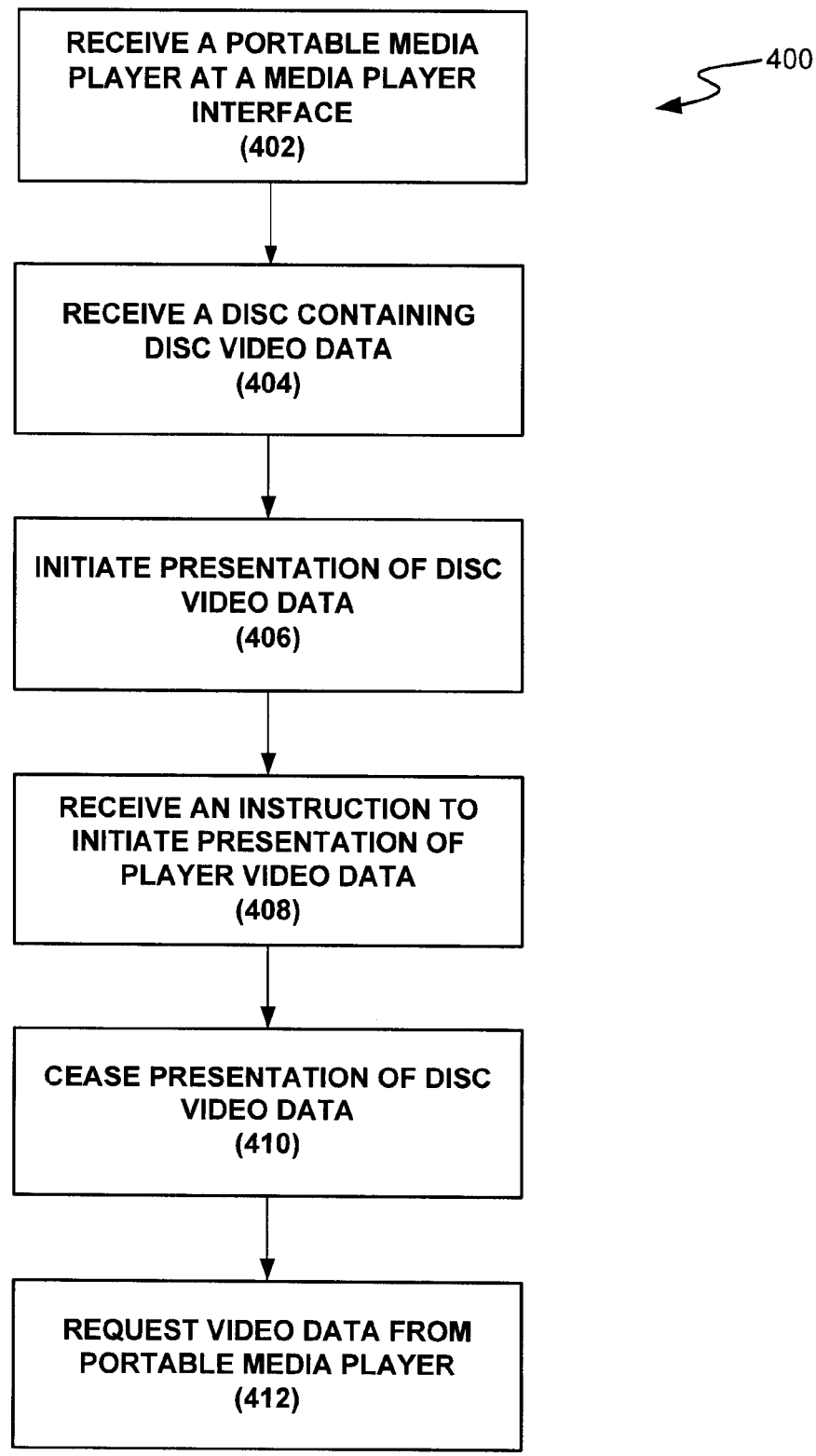
FIG. 4 shows a flowchart of an embodiment of a method for operating a master portable video display system.

FIG. 4 shows a flowchart of an embodiment of a method 400 for operating a master portable video display system. The method includes receiving 402 a PMP at a media player interface. For example, the PMP may be received at a wired interface, as described further herein. As another example, a wireless interface may be established through a handshaking or other process appropriate for the wireless protocol being used for the wireless interface. Player video data on the PMP may become accessible through this media player interface. In the embodiment shown, a disc containing disc video data is received 404. For example, the disc may be received at a disc mechanism. Disc video data on the disc may become accessible through the disc mechanism. Presentation of disc video data may initiate 406 based on a user instruction. In another embodiment, presentation of disc video data may initiate 406 as a default response to the a disc being received 404.

In alternate embodiments, the PMP and the disc may contain media data other than video data. For example, the other media data may include image data, audio data, software, and/or interactive data.

An instruction may be received 408 through a user interface to initiate presentation of player video data. Instructions may be received through a user interface, such as a control interface and/or a GUI, as described further herein. As described further herein, the user interface may include a GUI combined with the operation of an input element (e.g., a navigational control element). Alternatively, an input element may be operated without the combination of a GUI.

An instruction to initiate presentation of video data may be received from a number of types of inputs. For example, a video source selection element, as further described herein, may be an input that provides an instruction to initiate presentation of video data from a source including the PMP, the disc, or a portion of memory.

In one embodiment, a media processor may perform the method. The media processor may respond to an instruction to initiate presentation of video data by communicating with the source of video data to transfer video data from the source to the media processor. The media processor may further communicate with the source of video data to command and/or operate the source, including in a commissioned mode, as described further above.

In response to the instruction to initiate presentation of player video data 408, the media processor may cease presentation of video data 410 from a disc or from a portion of memory, and may continue to provide instructions for operating the disc and/or the portion of memory. For example, as described further above, the presentation may be stopped, paused, and/or a position in the media currently being presented may be stored.

Alternatively, an instruction may be received to select a source of video data other than the PMP (e.g., a selection of a disc as the source), and presentation may be ceased from the PMP. If the PMP is being operated by a media processor in a commissioned mode, the media processor may or may not release the PMP from a commissioned mode in relation to ceasing presentation of video data from the PMP. The commissioned mode is described further above. In one embodiment, the media processor may place the PMP into a commissioned mode in response to the PMP being received at the media player interface. In another embodiment, the media processor may place the PMP into a commissioned mode in response to an instruction to initiate the presentation player video data 412.

Initiating presentation of player video data 412 may be performed in response to instructions from a user received 408 from a control interface separate from the control interface of the PMP. For example, initiating presentation of player video data 412 may be performed in response to a media source selection element being operated. As another example, initiating presentation of player video data 412 may be performed in response to connection of a PMP to a MPVDS. In one embodiment, presentation of default player video data is initiated 412, such as the previously stored, paused, and/or stopped player video data. In another embodiment, presentation of player video data is initiated 412 after a user has given some other instruction. For example, initiation of presentation of player video data 412 may occur after a user selects the player video data from a list and/or directory. As another example, initiation of presentation of player video data 412 may occur after a user closes a cover element of the MPVDS. As another example, initiation of presentation of player video data 412 may occur after a user interacts with a GUI on the video display using a control interface of the MPVDS. As another example, initiation of presentation of player video data 412 may occur after the user views an introductory screen providing information about the player video data.

The following claims conclude the specification, the disclosure of which is not limited to the particular embodiments described or claimed.

What is claimed is:

1. A portable video presentation system, comprising:
 a body having a disc receptacle and a media player receptacle;
 a cover element hinged to the body such that it is movable between an open position, in which the disc receptacle and the media player receptacle are exposed for receiving a disc and a media player, respectively, and a closed position, in which the cover element is laid over the body so as to enclose the disc receptacle and the media player receptacle, wherein the cover element comprises:
  first and second surfaces, the first surface being positioned adjacent the disc receptacle and media player receptacle such that it directly encloses the disc receptacle and the media player receptacle and is hidden from view when the cover element is positioned in its said closed position, the second surface being positioned opposite the first surface such that it is exposed when the cover element is positioned in its said closed position, the first surface of the cover element lying directly above a disc placed in the disc receptacle when the cover element is in its said closed position;
  a video display positioned on the second surface of the cover element such that the video display is viewable while the cover element is positioned in its said closed position; and
  a control interface positioned on the second surface of the cover element, the control interface including a control element; and
 a media microprocessor adapted to select one of a plurality of states based on user input received from the control element, the plurality of states comprising:
  a disc video data presentation state wherein disc video data is received by the media microprocessor from the disc in the disc receptacle; and
  a media player video data presentation state wherein player video data is received by the media microprocessor from the media player in the media player receptacle.

2. The portable video presentation system of claim 1, further comprising:
 a media player interface connected to the media microprocessor, the media player interface adapted to:
  transmit to the media player information about one of the plurality of states;
  receive player video data from the media player; and
  provide power to the media player.

3. The portable video presentation system of claim 2, wherein the media player interface is an interface selected from the group consisting of a wired interface and a wireless interface.

4. The portable video presentation system of claim 1, wherein the cover element encloses the media player and prevents physical access to the media player and a media player control interface thereon when the cover element is in its said closed position.

5. The portable video presentation system of claim 1, further comprising:
 a disc player provided within the body and connected to the disc receptacle, the disc player being interconnected with the media microprocessor;
 a media player interface provided within the body and connected to the media player receptacle, the media player interface being interconnected with the media microprocessor;
 wherein the media microprocessor is adapted to:

selectively request the disc video data from the disc player or the player video data from the media player based on the user input;

modify the video data received in response to the request into a format suitable for the video display; and transmit the modified video data to the video display.

6. The portable video presentation system of claim 5, wherein the control element of the control interface provides navigational control elements in spatial relation corresponding to a portable media player control interface.

7. The portable video presentation system of claim 5, wherein the media microprocessor is adapted to present a graphical representation of a video control instruction on the video display;

wherein the graphical representation is associated with a portion of the control interface; and wherein the media microprocessor is further adapted to interpret a selection of the portion of the control interface as a selection of a video control instruction.

8. The portable video presentation system of claim 1, wherein the media microprocessor is configured to:

initiate presentation of the disc video data;

receive through the control interface an instruction to initiate presentation of the player video data;

in response to the instruction, cease the presentation of the disc video data; and request the player video data from the media player.

9. The portable video presentation system of claim 8, wherein the media player is put into a commissioned mode.

10. The portable video presentation system of claim 9, wherein the media player in the commissioned mode responds only to media player commands received by the media player through the control interface.

11. The portable video presentation system of claim 9, wherein the media player is put in the commissioned mode in response to placing the media player in the media player receptacle.

12. The portable video presentation system of claim 9, wherein the media player is put in the commissioned mode in response to receiving the instruction to initiate the presentation of the player video data.

13. The portable video presentation system of claim 1, wherein the cover element completely covers the video disc and the media player when it is in its said closed position such that the media player is not accessible without moving the cover element toward its said open position, the video display being configured to display a video thereon only when the cover element is in its said closed position.

14. The portable video presentation system of claim 13, wherein the cover element includes a window therein, the window being positioned over a screen provided on the media player when the cover element is in its said closed position such that the screen of the media player is viewable to a user through the window.

* * * * *